United States Patent
Takahashi

(10) Patent No.: US 10,601,260 B2
(45) Date of Patent: Mar. 24, 2020

(54) POWER TRANSMISSION APPARATUS, CONTROL METHOD FOR POWER TRANSMISSION APPARATUS, AND PROGRAM

(71) Applicant: CANON KABUSHIKI KAISHA, Tokyo (JP)

(72) Inventor: Naoto Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 100 days.

(21) Appl. No.: 15/321,144

(22) PCT Filed: Jun. 18, 2015

(86) PCT No.: PCT/JP2015/003069
§ 371 (c)(1),
(2) Date: Dec. 21, 2016

(87) PCT Pub. No.: WO2015/198568
PCT Pub. Date: Dec. 30, 2015

(65) Prior Publication Data
US 2017/0155284 A1  Jun. 1, 2017

(30) Foreign Application Priority Data

Jun. 26, 2014 (JP) .................. 2014-131618

(51) Int. Cl.
*H02J 50/80* (2016.01)
*H02J 50/40* (2016.01)
(Continued)

(52) U.S. Cl.
CPC .............. *H02J 50/80* (2016.02); *H02J 50/12* (2016.02); *H02J 50/40* (2016.02); *H02J 50/90* (2016.02)

(58) Field of Classification Search
CPC . H02J 5/005; H02J 7/025; H02J 17/00; B60L 11/182
See application file for complete search history.

(56) References Cited

U.S. PATENT DOCUMENTS 9,602,169 B2 * 3/2017 Nago ..................... H04W 76/14
2007/0228833 A1 * 10/2007 Stevens .................. H02J 5/005
307/45

(Continued)

FOREIGN PATENT DOCUMENTS

JP 2011525788 A 9/2011
JP 2011211866 A 10/2011

(Continued)

*Primary Examiner* — Rexford N Barnie
*Assistant Examiner* — David A Shiao
(74) *Attorney, Agent, or Firm* — Canon U.S.A., Inc. IP Division

(57) ABSTRACT

A power transmission apparatus transmitting power to a power reception apparatus and communicating with the power reception apparatus by applying a communication method which allows communication in a wider communication range than a power transmittable range includes a reception unit which receives a notification signal for notifying the existence of a power reception apparatus by applying the communication method, an instruction unit which instructs a power reception apparatus having transmitted the notification signal to change a load impedance consuming received power, a determination unit which determines that the source power reception apparatus has changed the load impedance in accordance with the instruction, and a wireless power transfer unit which wirelessly transfers power to the power reception apparatus if the determination unit determines that the source power reception apparatus has changed the load impedance in accordance with the instruction.

17 Claims, 7 Drawing Sheets

(51) Int. Cl.
　　　*H02J 50/90*　　　(2016.01)
　　　*H02J 50/12*　　　(2016.01)

(56) References Cited

U.S. PATENT DOCUMENTS

| | | | | |
|---|---|---|---|---|
| 2009/0174264 A1* | 7/2009 | Onishi | .................... | H02J 5/005 |
| | | | | 307/104 |
| 2011/0140538 A1* | 6/2011 | Jung | .................... | H02J 7/0027 |
| | | | | 307/104 |
| 2013/0038272 A1 | 2/2013 | Sagata | | |
| 2013/0063082 A1* | 3/2013 | Lee | ................... | H02J 7/025 |
| | | | | 320/108 |
| 2013/0293028 A1* | 11/2013 | Byun | .................... | H01F 38/14 |
| | | | | 307/104 |
| 2014/0009110 A1* | 1/2014 | Lee | ................... | H02J 7/025 |
| | | | | 320/108 |
| 2014/0197785 A1* | 7/2014 | Lee | ................... | H02J 7/025 |
| | | | | 320/108 |
| 2014/0361738 A1* | 12/2014 | Lee | ................... | H02J 5/005 |
| | | | | 320/108 |
| 2015/0180268 A1* | 6/2015 | Byun | .................... | H02J 17/00 |
| | | | | 320/108 |

FOREIGN PATENT DOCUMENTS

| | | | | | |
|---|---|---|---|---|---|
| JP | | 2012518338 A | | 8/2012 | |
| JP | | 2013511956 A | | 4/2013 | |
| JP | WO | 2014171229 A1 | * | 10/2014 | ............ H04W 76/14 |
| JP | | 2014533481 A | | 12/2014 | |
| WO | | 2013/168281 A1 | | 11/2013 | |
| WO | | 2014/034966 A1 | | 3/2014 | |
| WO | | 2015/072212 A1 | | 5/2015 | |

\* cited by examiner

[Fig. 1]
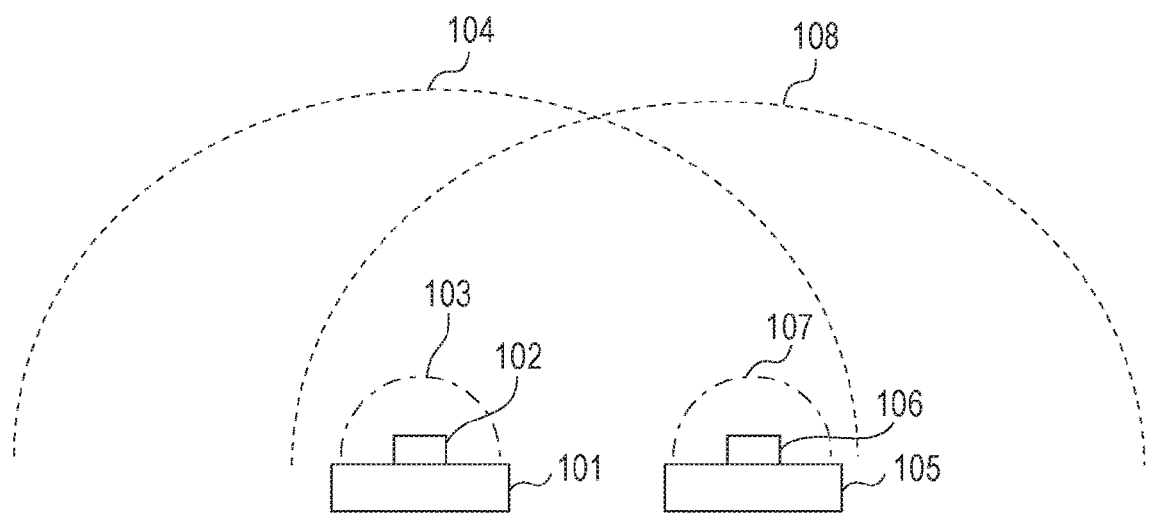

[Fig. 2]
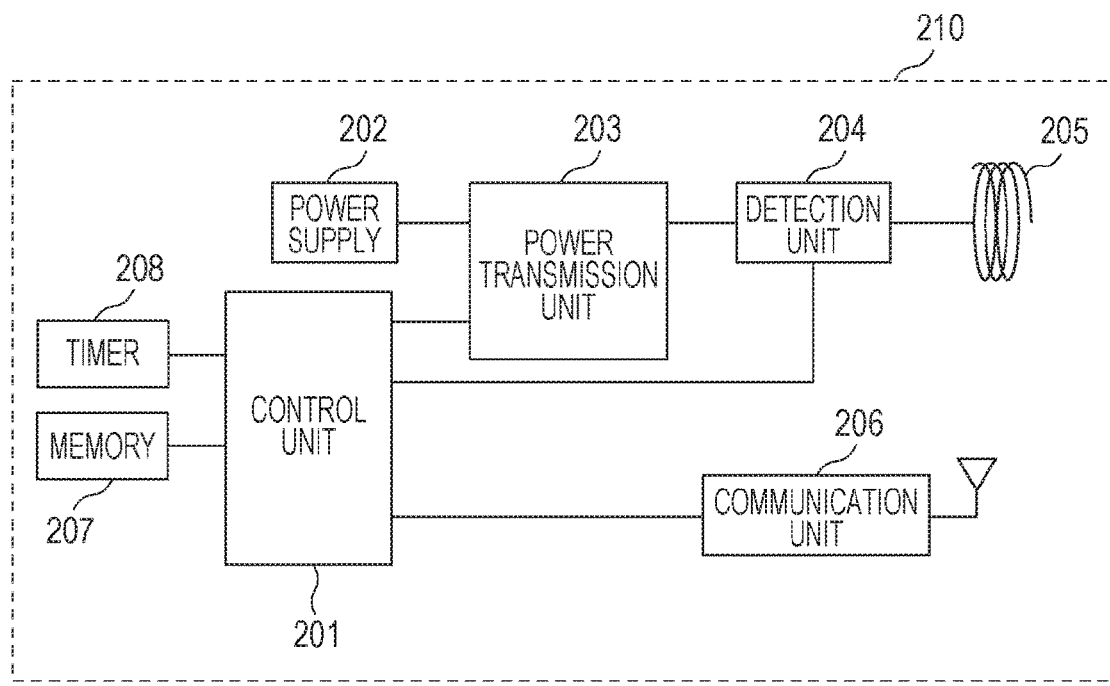

[Fig. 3]
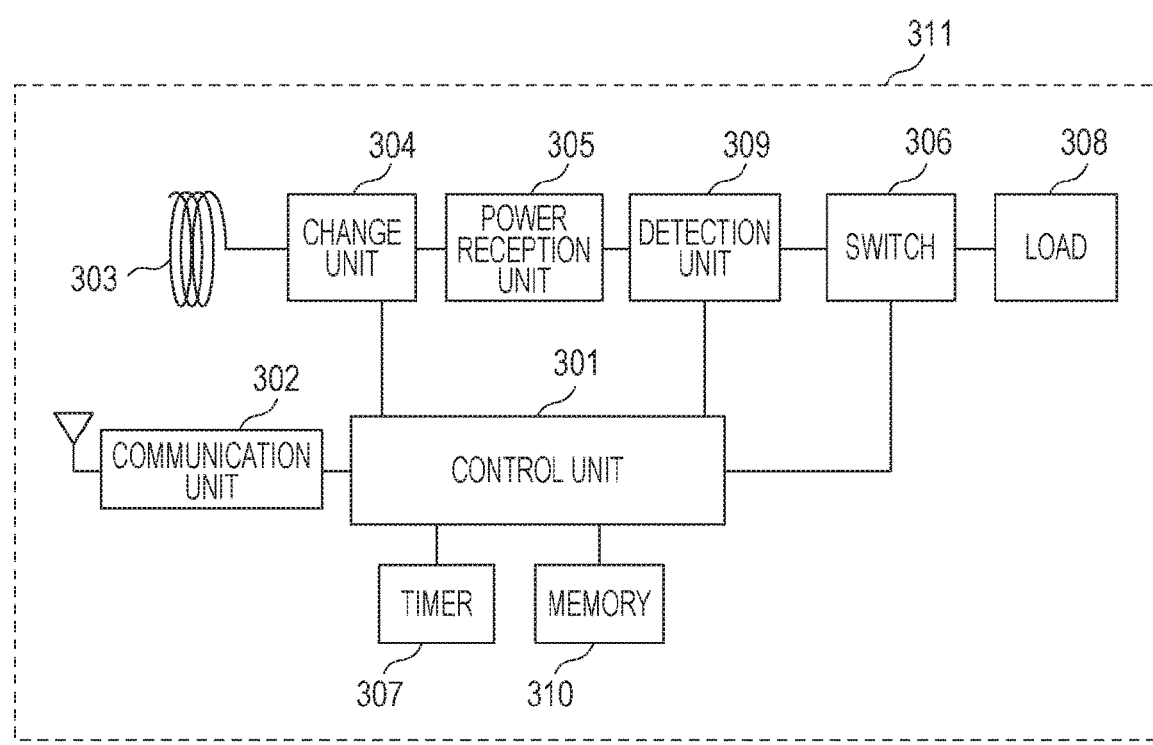

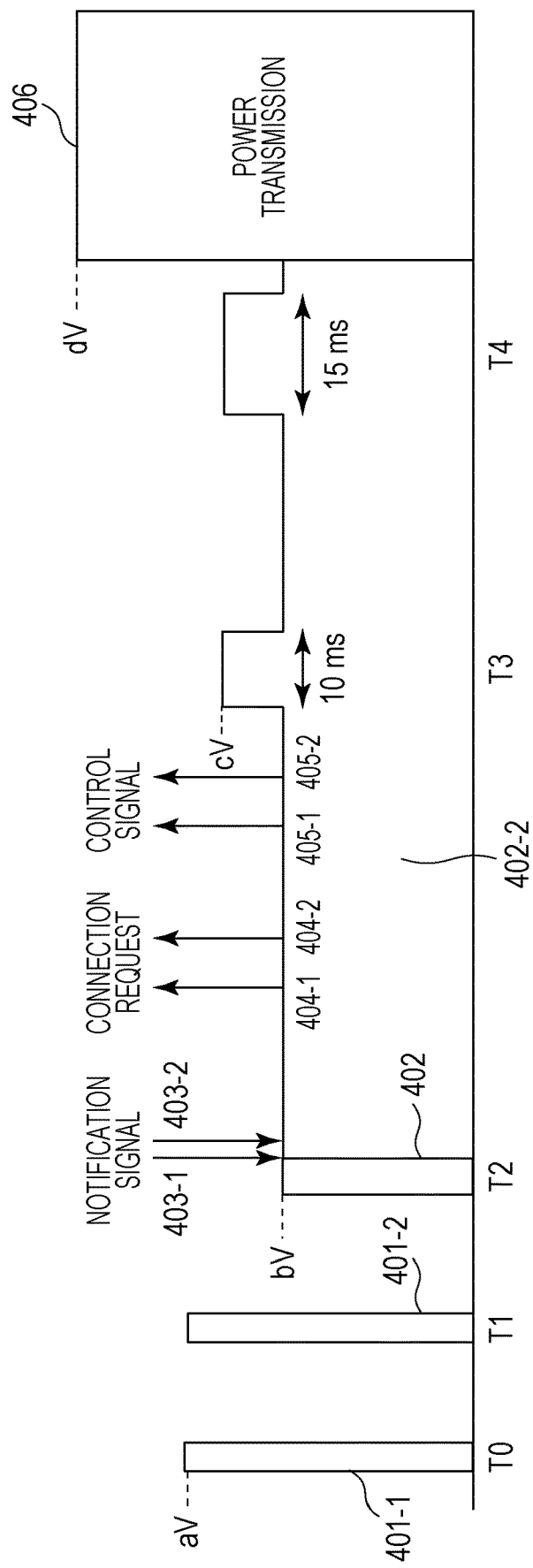

[Fig. 5]
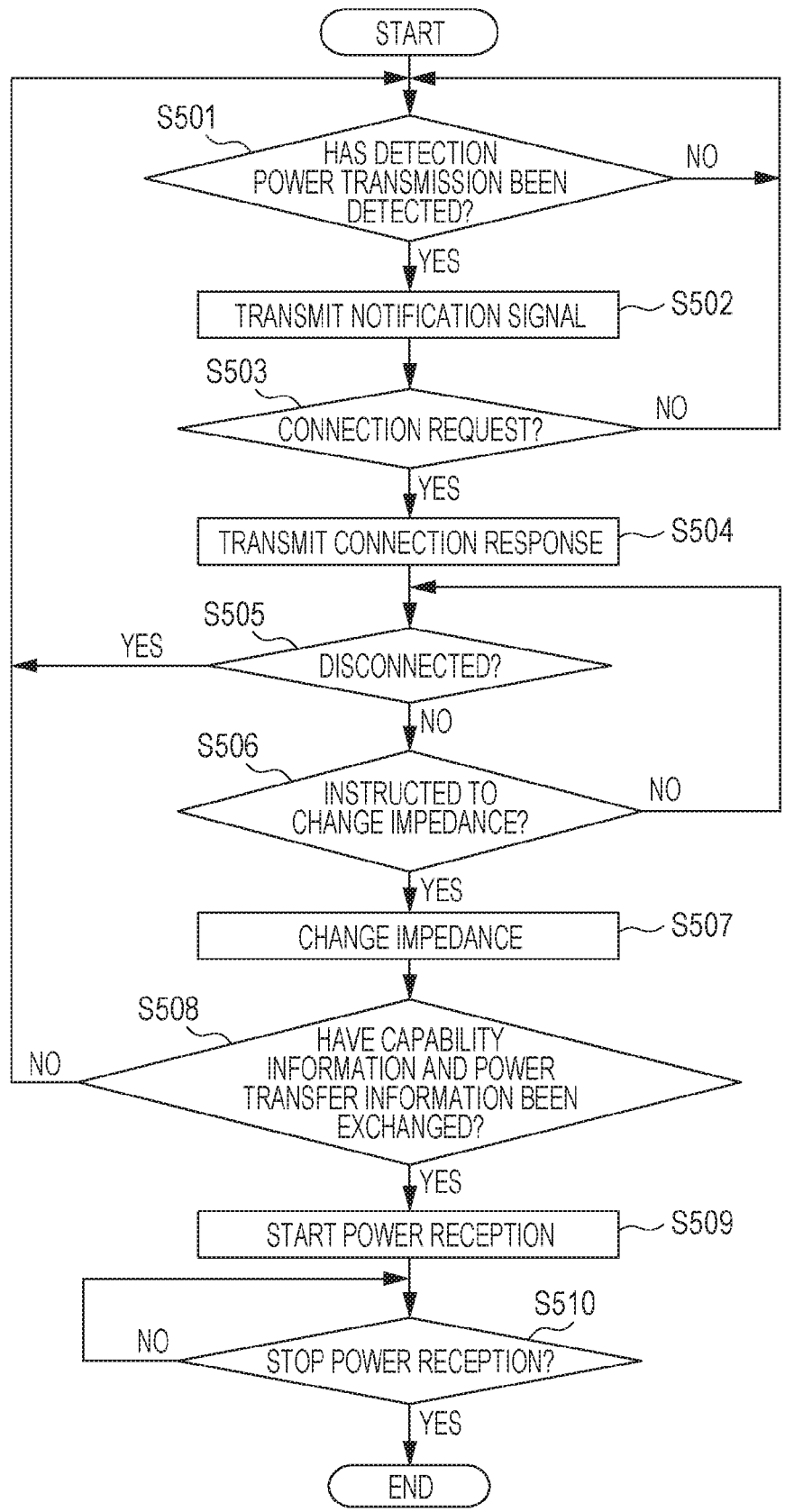

[Fig. 6]
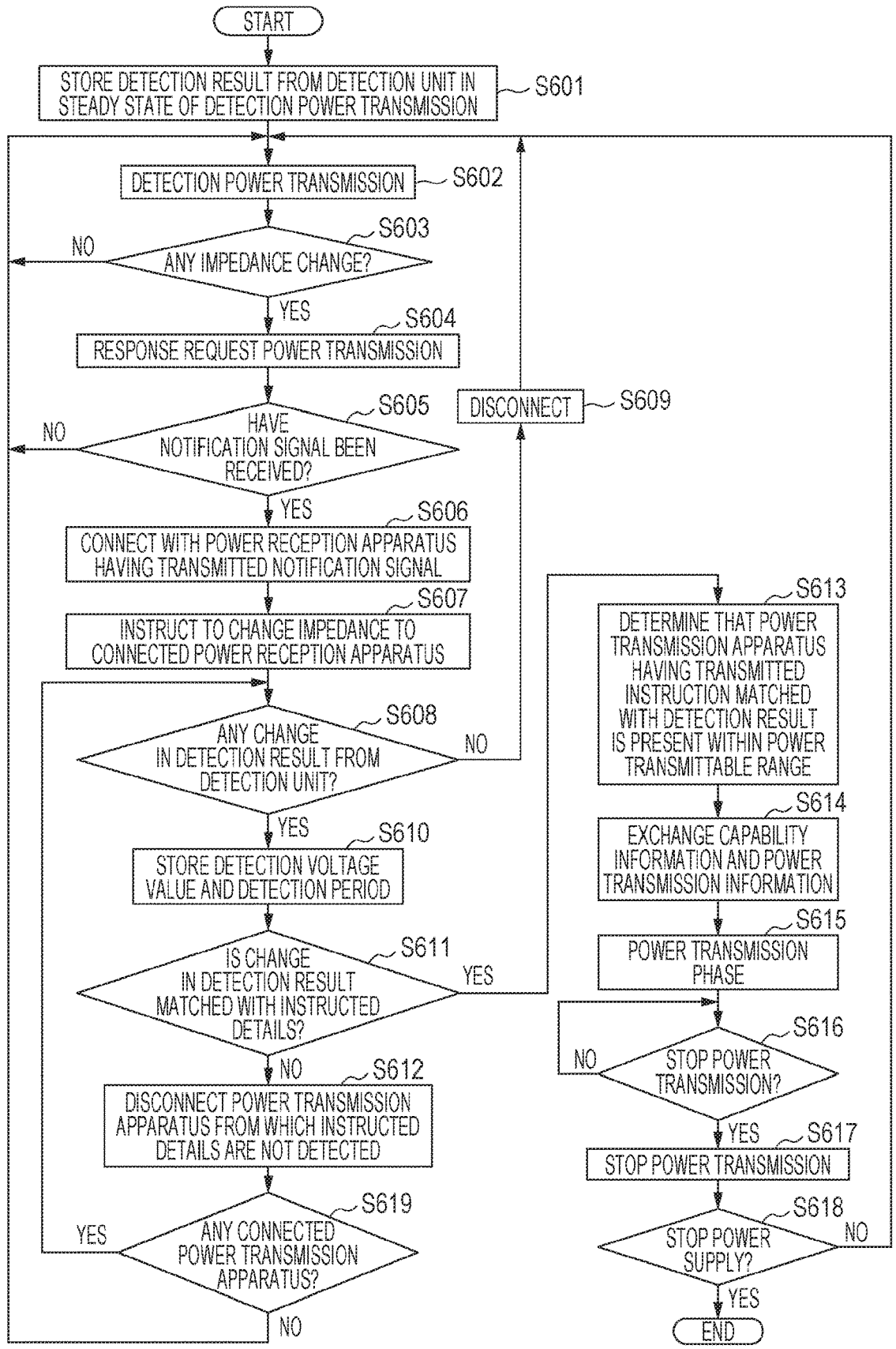

POWER TRANSMISSION APPARATUS, CONTROL METHOD FOR POWER TRANSMISSION APPARATUS, AND PROGRAM

TECHNICAL FIELD

The present invention relates to a wireless power transfer technology

BACKGROUND ART

In the past, a wireless power transfer system has been known which includes a power transmission apparatus configured to wirelessly transmit power and a power reception apparatus configured to receive power supplied from the power transmission apparatus. In some wireless power transfer systems, a power transmission apparatus may detect a power reception apparatus within a range to which the power transmission apparatus is capable of transmitting power and transmit power to the detected power reception apparatus.

PTL 1 discloses a technology in which a power reception apparatus notifies its ID and apparatus type to a power transmission apparatus so that authentication processing may be performed between the power reception apparatus within a power transmittable range of the power transmission apparatus and the power transmission apparatus.

In a case where a plurality of power transmission apparatuses are closely placed and the plurality of power transmission apparatuses have overlapping communication ranges for performing communications required for wireless power transfer such as exchange of control information and authentication processing, a power reception apparatuses may possibly communicate with a power transmission apparatus different from a power transmission apparatus desired by the power reception apparatus to receive power from.

A case will be described in which a first power transmission apparatus and a second power transmission apparatus are placed at positions where their communication ranges overlap each other and a first power reception apparatus is positioned within the power transmission range of the first power transmission apparatus and a second power reception apparatus is positioned within the power transmission range of the second power transmission apparatus, for example. When the first power reception apparatus and the second power reception apparatus broadcast messages for establishing a communication connection, the messages are received by the first power transmission apparatus and the second power transmission apparatus.

Though the first power transmission apparatus is originally not required to transmit power to the second power reception apparatus which is not placed within the power transmission range of the first power transmission apparatus, the first power transmission apparatus having received the message from the second power reception apparatus may possibly establish a communication connection for executing a wireless power transfer to the second power reception apparatus. Similarly, though the second power transmission apparatus is originally not required to transmit power to the first power reception apparatus which is not placed within the power transmission range of the second power transmission apparatus, the second power transmission apparatus having received the message from the first power reception apparatus may possibly establish a communication connection for executing a wireless power transfer to the first power reception apparatus. This improperly established communication connection may cause unnecessary processing for power transmission.

CITATION LIST

Patent Literature

PTL 1: PCT Japanese Translation Patent Publication No. 2011-525788

SUMMARY OF INVENTION

The present invention provides a power transmission apparatus including a wireless power transfer unit configured to transmit power wirelessly to a power reception apparatus, a reception unit configured to receive a notification signal for notifying the existence of a power reception apparatus by applying a communication method which allows communication in a wider communication range than a power transmittable range in which the wireless power transfer unit is capable of transmitting power, an instruction unit configured to instruct a power reception apparatus being a source of the notification signal to change a load impedance consuming received power, and a determination unit configured to determine from a power transmission result that the power reception apparatus being the source of the notification signal has changed the load impedance in accordance with the instruction given by the instruction unit. In this case, if the determination unit determines that the power reception apparatus being the source of the notification signal has changed the load impedance in accordance with the instruction given by the instruction unit, the wireless power transfer unit performs a power transmission for supplying power requested by the power reception apparatus. If the determination unit does not determine that the power reception apparatus being the source of the notification signal has changed the load impedance in accordance with the instruction given by the instruction unit, the wireless power transfer unit limits power transmission for supplying power requested by the power reception apparatus.

Further features of the present invention will become apparent from the following description of exemplary embodiments with reference to the attached drawings.

BRIEF DESCRIPTION OF DRAWINGS

FIG. 1 illustrates a system configuration of a wireless power transfer system.

FIG. 2 illustrates a configuration of a power transmission apparatus.

FIG. 3 illustrates a configuration of a power reception apparatus.

FIG. 4A is a sequence chart of a wireless power transfer system.

FIG. 5 is a flowchart illustrating operations of a power reception apparatus.

FIG. 6 is a flowchart illustrating operations of a power transmission apparatus.

DESCRIPTION OF EMBODIMENTS

Figure 4B:
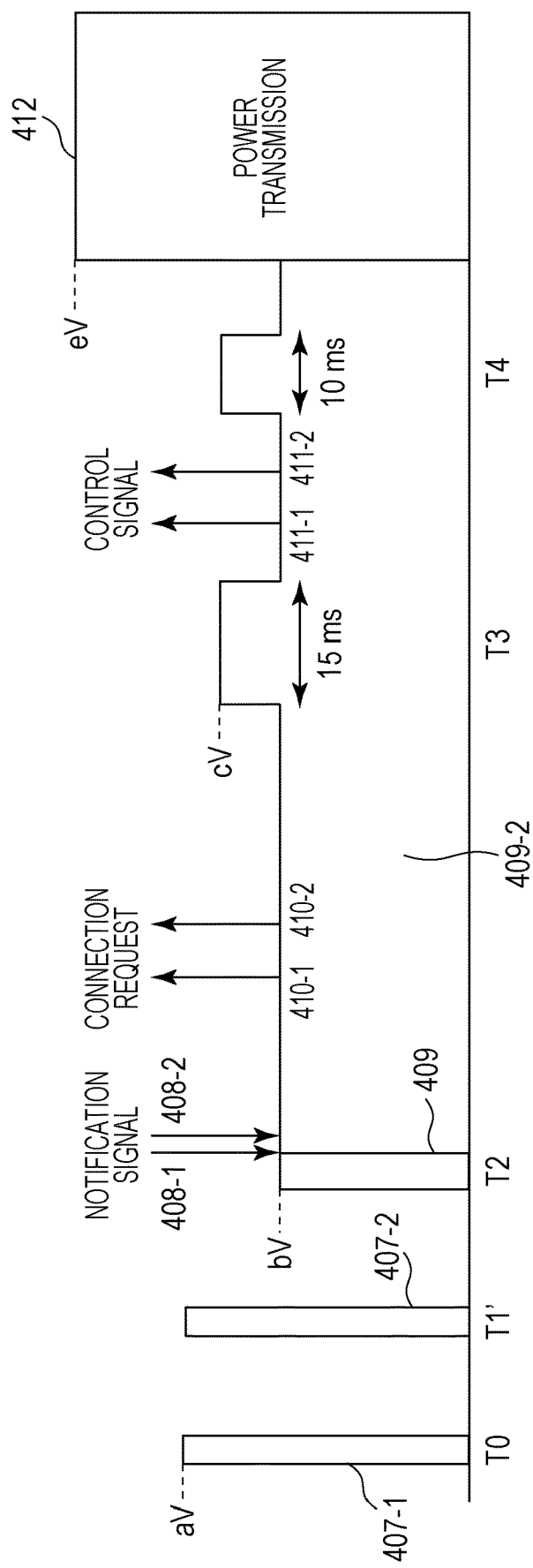
FIG. 4B is a sequence chart of a wireless power transfer system.

Embodiments which will be described below may allow a power transmission apparatus to reduce unnecessary processes for wireless power transfer.

First Embodiment

FIG. 1 illustrates a wireless power transfer system configured to implement wireless power transfer according to a first embodiment. A wireless power transfer system according to this embodiment implements wireless power transfer by using magnetic field resonance method. Magnetic field resonance method transmits power by coupling resonances of a resonator (resonating element) in a power transmission apparatus and a resonator (resonating element) in the power reception apparatus. Though a wireless power transfer system using magnetic field resonance method will be described according to a first embodiment, the wireless power transmission method (noncontact power transfer method) is not limited thereto. An embodiment of the present invention may apply a power transmission method using inductive coupling, electric field resonance, microwaves, laser (light) or the like.

Referring to FIG. 1, a first power transmission apparatus 101, a first power reception apparatus 102, a second power transmission apparatus 105, and a second power reception apparatus 106 are provided. The first power transmission apparatus 101 and the second power transmission apparatus 105 are power transmission apparatuses configured to transmit power wirelessly. The first power reception apparatus 102 and the second power reception apparatus 106 are power reception apparatuses each configured to receive power transmitted wirelessly. In the wireless power transfer system according to this embodiment, communication for authentication and communication of control information for controlling wireless power transfer are performed between the power transmission apparatus and the power reception apparatus. The power transmission and reception between apparatuses will sometimes be called power transmission, power reception or power transfer (wireless power transfer), and data exchange for authentication and exchange of control information will be simply called communication (wireless communication). Examples of the control information may include an attribute of a power reception apparatus (such as an apparatus type), a power reception capability (maximum receivable power), and feedback information regarding a power reception state (such as a value of power being received).

FIG. 1 illustrates a power transmittable range (power transmission range) 103 of the first power transmission apparatus 101, a communicable range (communication range) 104 of the first power transmission apparatus 101, a power transmittable range 107 of the second power transmission apparatus 105 and a communicable range 108 of the second power transmission apparatus 105. The wireless power transfer and wireless communication according to this embodiment may apply different frequency bands of electric waves. As illustrated in FIG. 1, the wireless power transfer system of this embodiment has a wider communicable range than the power transmittable range of the power transmission apparatus. This is because different frequency bands of electric waves are used between the wireless power transfer and the wireless communication and their electric wave reaching ranges are thus not identical. The power transmittable range of wireless power transfer is generally shorter than the communicable range of a wireless communication because wireless power transfer involves a loss increasing as the distance increases and a large influence on an object present in the power transmittable range. Reducing the output power of electric waves of a wireless communication such that the communicable range of a wireless communication and the power transmittable range of a wireless power transfer may be identical may sometimes prevent proper communication. Therefore, in the present wireless power transfer system, electric waves to be used for those purposes are transmitted so as to implement a wider communicable range than the power transmittable range of the power transmission apparatus.

Communications to be performed between apparatuses in the wireless power transfer system of this embodiment are based on Bluetooth (registered trademark) 4.0 standard. Bluetooth™ 4.0 defines a communication method called Bluetooth™ Low Energy (BLE) for relatively low power consumption. In the present wireless power transfer system, a power transmission apparatus controls a network and operates as a master defined in BLE, which is a key station of the network. This is because a power transmission apparatus is required to communicate with a plurality of power reception apparatuses to transmit power to the plurality of power reception apparatus by one operation. A power reception apparatus operates as a slave defined in BLE, which connects to the master and communicates under control of the master.

Having described the communication of the embodiment is based on BLE, the communication may be based on other communication standards. For example, the communication may be based on wireless LAN (IEEE802.11 series) or NFC (Near Field Communication). Having illustrated two power transmission apparatuses and two power reception apparatuses, three or more power transmission apparatues and power reception apparatuses may be provided.

Next, configurations of the apparatuses in the wireless power transfer system will be described. FIG. 2 illustrates a configuration of a power transmission apparatus in the wireless power transfer system. FIG. 2 is an overview of a power transmission apparatus 210 (first power transmission apparatus 101 or second power transmission apparatus 105). A control unit 201 controls the power transmission apparatus 210. The control unit 201 may be a CPU (Central Processing Unit), for example, and generally controls the apparatus based on a control program, which will be described below, stored in a memory 208 and executed by the CPU. A power supply 202 is used for wireless power transfer from the power transmission apparatus 210. The power supply 202 is a commercial power supply or a battery. A power transmission unit 203 converts DC or AC power input from the power supply 202 to AC frequency power in a transmission band and generates electromagnetic waves to be received by a power reception apparatus through a power transmission antenna 205.

A detection unit 204 detects input voltage to the power transmssion antenna 205. The voltage detected by the detection unit 204 may be converted to power to be output from the power transmission antenna 205 to a power reception apparatus. The detection unit 204 may be configured to detect input current or an input power value to the power transmission antenna 205.

Based on the detection from the result detection unit 204, whether any object exists which receives power output from the power transmission apparatus 210 or not. This is because a detection result from the detection unit 204 in a case no object exists within the power transmittable range is different from a detection result from the detection unit 204 in a case where an object which consumes transmitted power exists within the power transmittable range. Based on a detection result from the detection unit 204, a change may be detected in power consumption in an object which receives power output from the power transmission apparatus 210. This is because a detection result from the detection unit 204 in a case where an object consumes 1 W in the power transmittable range is different from a detection result in a case where the object consumes 2 W when the power transmission apparatus transmits power at a constant output rate, for example. In other words, based on a detection result from the detection unit 204, a change in load of power output from the power transmission apparatus may be detected.

A communication unit 206 is usable for communication with a power reception apparatus. The communication unit 206 includes a chip usable for controlling BLE-based wireless communication and an antenna usable for transmitting a signal. An example of the power transmission apparatus 210 may be a printer, a PC or other apparatuses.

Next, a configuration of the power reception apparatus in the wireless power transfer system will be described with reference to FIG. 3. FIG. 3 is an overview of a power reception apparatus 311 (first power reception apparatus 102 or second power reception apparatus 106). A control unit 301 controls a power reception apparatus 311. The control unit 201 may be a CPU, for example, and generally controls the apparatus based on a control program, which will be described below, stored in a memory 310 and executed by the CPU. A communication unit 302 communicates with the power transmission apparatus 210. The communication unit 302 includes a chip usable for controlling BLE-based wireless communication and an antenna usable for transmitting a signal. A power reception antenna 303 is usable for receiving wireless power transfer from the power transmission apparatus 210. A change unit 304 changes an impedance of the power reception antenna 303. In a case where an instruction to change the impedance is received by the communication unit 302 from the power transmission apparatus 210, the change unit 304 changes the impedance of the power reception antenna 303 to a value according to the received instruction. The change unit 304 further changes the impedance of the power reception antenna 303 for a period based on an instruction transmitted from the power transmission apparatus 210 and received by the communication unit 302. The change unit 304 changes the impedance of the power reception antenna 303 to adjust the power reception amount from the power transmission apparatus 210. The change unit 304 adjusts power to be consumed by the power reception antenna 303 in power output and received from the power transmission apparatus 210. In other words, the change unit 304 changes a load which consumes power received from the power transmission apparatus 210.

A power reception unit 305 generates power from electromagnetic waves received by the power reception antenna 303. The power reception unit 305 resonates with electromagnetic waves received from the power reception antenna 303 and acquires AC power from the resonance. The power reception unit 305 then rectifies the AC power to DC power or AC power at a desired frequency and outputs the resulting power. A switch 306 is usable for changing input of received power to a load 308 which operates by using received power as a power supply. The load 308 may be a chargeable battery and may be configured to accumulate received power in the battery. A timer 307 is usable for measuring a predetermined period of time. A detection unit 309 converts power received from the power transmission apparatus 210 to a voltage value and detects it. A memory 310 stores information.

The control unit 301 and communication unit 302 in the power reception apparatus 311 may operate by using power transmitted from the power transmission apparatus 210. This configuration allows the power reception apparatus 311 to start a communication with the power transmission apparatus 210 even when power required for starting wireless power transfer from the power transmission apparatus 210 is not held. Examples of the power reception apparatus 311 may be a digital camera, a cellular phone or other apparatus.

The configurations in FIGS. 2 and 3 are given for illustration purpose only, and the power transmission apparatus 210 and power reception apparatus 311 may include a hardware configuration excluding the illustrated hardware configuration. For example, the power transmission apparatus 210 and power reception apparatus 311 may have an operation unit to be operated to input by a user for operating the apparatus. The power transmission apparatus 210 and power reception apparatus 311 may have an indication unit having functions of outputting visibly recognizable information such as an LCD and an LED or outputting audio such as a speaker for giving indications, Data exchange between the power transmission apparatus and the power reception apparatus in the wireless power transfer system having the aforementioned configuration includes three phases of a detection phase, a communication establishment phase, and a power transmission phase. In the detection phase, electromagnetic waves are intermittently generated from the power transmission antenna 205 so that power transmission (detection power transmission) for detecting the power reception apparatus 311 may be performed intermittently. In a case where an object is placed in a power transmittable range of the power transmission apparatus 210 while the detection power transmission is being performed in the detection phase, the detection power is supplied to the object. In this case, a load impedance viewed from the power transmission apparatus 210 changes, and voltage or current has a distinctive change in the power transmission apparatus 210. Detecting a change in voltage or current in the power transmission apparatus 210 allows detection of an object placed in a power transmittable range of the power transmission apparatus 210. If the power transmission apparatus 210 detects that an object exists in a power transmittable range of the power transmission 210, the power transmission 210 starts power transmission (response request power transmission) for supplying the power reception apparatus 311 the power required for requesting the power transmission apparatus 210 to transmit a response. The response request power has a power value enough for activating the control unit 301 and communication unit 302 in the power reception apparatus 311. The power value of detection power transmission is higher than the power value of the response request power transmission.

The power reception apparatus 311 having received the response request power transmits an advertise packet for causing another apparatus to transmit a communication connection request through the communication unit 302 within a predetermined period of time (such as 100 ms) from the response request power transmission. If the power transmission apparatus 210 receives the advertise packet from the power reception apparatus 311 in response to the response request power transmission, the power transmission apparatus 210 determines that the power reception apparatus 311 exists in the power transmittable range.

The advertise packet is a signal defined in BLE for transmitting by broadcast information such as the name of its apparatus and a type of service to be provided by the apparatus. The advertise packet is usable for notifying surrounding apparatuses of the existence of the apparatus and that the apparatus has a standby state for connection from a surrounding apparatus. The advertise packet from the power reception apparatus 311 includes service information describing that a wireless power transmission method supported by the system is executable. The advertise packet will be called a notification signal hereinafter.

If the power transmission apparatus 210 does not receive the notification signal from the power reception apparatus 311 within a predetermined period of time (such as 100 ms) from the start of the response request power transmission, the power transmission apparatus 210 stops the response request power transmission. Then, the detection power transmission is performed intermittently by intermittently generating electro-magnetic waves from the power transmission antenna 205 again.

The communication establishment phase starts if the power transmission apparatus 210 detects the notification signal from the power reception apparatus 311 in the detection phase. The power transmission apparatus 210 transmits a Connection Request packet (connection request) to the power reception apparatus 311 having transmitted the notification signal through the communication unit 206. Then, the power transmission apparatus 210 establishes a communication connection with the power reception apparatus 311 in accordance with the transmitted connection request. Further in the communication establishment phase, the communication connection established between the power transmission apparatus 210 and the power reception apparatus 311 is used to communicate (exchange) capability information of the power transmission apparatus 210 and the power reception apparatus 311 with each other. The capability information may include, for example, transmittable/receivable amount of power, a hardware configuration, a supported power transfer method, and a version of a supported power transfer standard. In the communication establishment phase, the power transmission apparatus 210 extends (continue) the response request power transmission and performs power transmission for causing the power reception apparatus 311 to perform communication for a communication connection and communication of capability information.

In the communication establishment phase, the power transmission apparatus 210 instructs, through the communication unit 206, the communication-connected power reception apparatus 311 to change the impedance of the power reception antenna 303 to a predetermined value over a predetermined period of time. If the power reception apparatus 311 receives the instruction for the impedance change from the power transmission apparatus 210 through the communication unit 302, the power reception apparatus 311 controls the change unit 304 in accordance with the instruction so as to change the impedance of the power reception antenna 303. The power transmission apparatus 210 determines whether the impedance change has been executed by the power reception apparatus 311 in accordance with the instruction or not based on a detection result from the detection unit 204. If the power transmission apparatus 210 determines that the power reception apparatus 311 has executed the impedance change in accordance with the instruction, the power transmission apparatus 210 determines that the power reception apparatus is present within the power transmission range of the power transmission apparatus 210. On the other hand, if the power transmission apparatus 210 determines that the power reception apparatus 311 has not executed the impedance change in accordance with the instruction, the power transmission apparatus 210 determines that the power reception apparatus is not present in the power transmission range of the power transmission apparatus 210.

The power transmission apparatus 210 in the communication establishment phase establishes a communication connection with the power reception apparatus 311 and exchanges the capability information. If the power transmission apparatus 210 determines that the power reception apparatus 311 has executed the impedance change in accordance with the instruction, the power transmission phase starts. In the power transmission phase, the power transmission apparatus 210 transmits to the power reception apparatus 311 higher power than the power for detection power transmission and response request power transmission in the detection phase and communication establishment phase. In the power transmission phase, the power transmission apparatus 210 receives through the communication unit 206 control information for control wireless power transfer such as a value of power received from the power reception apparatus 311, a request for increasing or reducing the amount of power to be transmitted and a stop of power transmission. The power transmission apparatus 210 generates electromagnetic waves from the power transmission antenna 205 in accordance with the received control information to perform power transmission.

If the power transmission phase ends and if no other power reception apparatus 320 is receiving power transmission in the power transmission phase, the power transmission apparatus 210 starts the operations in the detection phase again.

Operations to be performed in the wireless power transfer system which implements wireless power transfer according to this embodiment will be described with reference to the sequence chart illustrated in FIGS. 4A and 4B. FIG. 4A illustrates operations to be performed by the first power transmission apparatus 101, and FIG. 413 illustrates operations to be performed by the second power transmission apparatus 105. FIGS. 4A and 4B further illustrate voltages to be detected by the detection unit 204 which is provided in each of the first power transmission apparatus 101 and the second power transmission apparatus 105. The first power transmission apparatus 101 and the second power transmission apparatus 105 start operations in the detection phase in response to detection of a power-on state or an operation instruction input by a user. In the detection phase, the first power transmission. apparatus 101 and the second power transmission apparatus 105 perform intermittent detection power transmissions through the power transmission antenna 205 at times T0, T1, and T2. The period (time T0 to time T1 and time T1 to time T2) of the detection power transmissions may be defined with arbitrary values. The period for performing the detection power transmissions may be set randomly for each power transmission apparatus. The first power transmission apparatus 101 and the second power transmission apparatus 105 may perform the detection power transmissions based on different periods from each other.

Here, the first power transmission apparatus 101 and the second power transmission apparatus 105 prestore detection results aV from the detection unit 204 in the memory 208 upon detection power transmissions (401-1, 401-2, 407-1, 407-2) in a steady state. The steady state here is a state that no other apparatuses are close to or in contact with the power transmission apparatus 210 and no apparatuses are consuming power output by the power transmission apparatus 210. FIGS. 4A and 4B assume that the first power transmission apparatus 101 and the second power transmission apparatus 105 use an equal amount of power for the detection power transmission. However, different amounts of power from each other may used by the apparatuses for the detection power transmission.

It is assumed here that, during a period from a time T1 to a time T2, a user of the first power reception apparatus 102 places the first power reception apparatus 102 to which power transfer is performed over the first power transmission apparatus 101 within a power transferrable range of the first power transmission apparatus 101. It is further assumed that a user of the second power reception apparatus 106 also places the second power reception apparatus 106 to which power transfer is performed over the second power transmission apparatus 105 within a power transferrable range of the second power transmission apparatus 105.

In a case where an object enters to the power transferrable ranges of the first power transmission apparatus 101 and the second power transmission apparatus 105 and their output power is received (consumed) by the object, the corresponding detection units 204 detect a different value from that detected in the steady state. In other words, the detection units 204 detect a change in load impedance, viewed from the apparatus sides, which is caused by the proximity of the object. In the first power transmission apparatus 101 and second power transmission apparatus 105, the corresponding detection units 204 detect a different value from the detection value aV in the steady state to detect that an object has entered to the power transferrable ranges of the apparatuses (402, 409). In other words, in response to proximity of a power reception apparatus to the first power transmission apparatus 101 and second power transmission apparatus 105, the corresponding detection units 204 may detect a voltage value bV during a detection power transmission lower than that in the steady state.

The first power transmission apparatus 101 and second power transmission apparatus 105 having detected proximity of an object to them start a response request power transmission (402-2, 409-2). The detection power transmission and the response request power transmission may apply different power values from each other, and the response request power transmission may apply higher power than that for the detection power transmission. In this case, the detection results from the detection unit 204 in the steady state during the response request power transmission are stored in the memory 208.

As illustrated in FIG. 1, the power transmittable range in the wireless power transfer system is narrower than the communicable range, and the detection power transmission of the first power transmission apparatus 101 does not have an influence on the second power reception apparatus 106. In other words, the detection power transmission performed by the first power transmission apparatus 101 does not have an influence on the power transmittable range of the second power transmission apparatus 105. Similarly, the detection power transmission of the second power transmission apparatus 105 does not have an influence on the power transmittable range of the first power transmission apparatus 101.

In a case where the first power transmission apparatus 101 and second power transmission apparatus 105 have power transmittable ranges positionally overlapping each other, each of the first power transmission apparatus 101 and second power transmission apparatus 105 may output as an error notification an alert that the power transmittable range is influenced by another power transmission apparatus or a notification prompting to move away from another power transmission apparatus.

In a case where the first power reception apparatus 102 detects a response request power transmission (402-2) from the first power transmission apparatus 101, a notification signal is transmitted from the communication unit 302 within a predetermined period of time (such as 100 ms) (403-1). In a case where the second power reception apparatus 106 detects a response request power transmission (409-2) from the second power transmission apparatus 105, a notification signal is transmitted from the communication unit 302 within a predetermined period of time (such as 100 ms) (403-2).

The first power reception apparatus 102 and second power reception apparatus 106 may transmit the notification signals by using power received from the response request power transmission. In this case, the power reception apparatus is allowed to communicate with the power transmission apparatus and start wireless power transfer even though it does not hold power required for transmitting the notification signal.

As illustrated in FIG. 1, because the wireless power transfer system has a communicable range narrower than the power transmittable range, the notification signal from the first power reception apparatus 102 is also received by the second power transmission apparatus 105. Similarly, the notification signal from the second power reception apparatus 106 is also received by the first power transmission apparatus 101. In other words, as illustrated in FIGS. 4A and 4B, the first power transmission apparatus 101 receives the notification signals from both of first power reception apparatus 102 and the second power reception apparatus 106 (403-1, 403-2).

The first power transmission apparatus 101 transmits a connection request to the first power reception apparatus 102 and the second power reception apparatus 106 having transmitted the notification signals received by the first power transmission apparatus 101 (404-1, 404-2). The first power reception apparatus 102 and the second power reception apparatus 106 connect to the first power transmission apparatus 101 in accordance with the received connection request from the first power transmission apparatus. Similarly, the second power transmission apparatus 105 transmits a connection request to the first power reception apparatus 102 and the second power reception apparatus 106 having transmitted the notification signals received by the second power transmission apparatus 105 (404-1, 404-2). The first power reception apparatus 102 and second power reception apparatus 106 connect to the second power transmission apparatus 105 in accordance with the connection request received by the second power transmission apparatus 105.

It is assumed here that the first power transmission apparatus 101 receives the notification signals from the first power reception apparatus 102 and second power reception apparatus 106 before a lapse of a predetermined period of time (100 ms) after the response request power transmission in 402-2 starts. Similarly, it is assumed that the second power transmission apparatus 105 receives the notification signals from the first power reception apparatus 102 and the second power reception apparatus 106 before a lapse of a predetermined period of time (100 ms) after the response request power transmission in 409 is performed. Thus, the first power transmission apparatus 101 recognizes that both of the first power reception apparatus 102 and the second power reception apparatus 106 respond to the response request power transmissions output by them. In other words, the first power transmission apparatus 101 recognizes that both of the first power reception apparatus 102 and the second power reception apparatus 106 exist within their power transmittable ranges. However, actually, the second power reception apparatus 106 does not respond to the response request power transmission from the first power transmission apparatus 101 but responds to the response request power transmission from the second power transmission. apparatus 105. The second power reception apparatus 106 does not exist in the power transmittable range 103 of the first power transmission apparatus 101. When the first power transmission apparatus 101 shifts to the power transmission phase in accordance with a control signal from the second power reception apparatus 106 at this point in time, power transmission control is performed on the second power reception apparatus 106 which is not present within the power transmittable range of the first power transmission apparatus 101, causing a malfunction.

The power transmission performed for the second power reception apparatus 106 which is not present in the power transmittable range of the first power transmission apparatus 101 may possibly reduce the efficiency for power transmission to the first power reception apparatus 102 present in the power transmittable range of the first power transmission apparatus 101. This same problem also occurs in the second power transmission apparatus 105.

Accordingly, in order to prevent the problem, the power transmission apparatus 210 in the wireless power transfer system instructs the power reception apparatus to change the load impedance after a communication with the power reception apparatus 311 is established. The power transmission apparatus 210 then shifts to the power transmission phase if an impedance change based on the instruction is detected. In other words, the power transmission apparatus 210 instructs the corresponding power reception apparatus to change a load which consumes output power, and the power transmission apparatus 210 determines the instructed change of the load so that the power transmission apparatus 210 identifies the power reception apparatus to which power is to be transmitted within the power transmittable range.

After the communication connection between the first power reception apparatus 102 and the second power reception apparatus 106, the first power transmission apparatus 101 transmits an instruction to change the impedance of the power reception antenna 303 to the first power reception apparatus 102 and the second power reception apparatus 106 through the communication unit 206 (405-1, 405-2). The instruction to change the impedance may designate a value of the impedance and a period of time for changing the impedance to the value. The value of impedance to be designated to the power reception apparatus 311 by power transmission apparatus 210 according to this embodiment is set to a value which substantially prevents consumption of power transmitted by the power transmission apparatus 210. The value may be appropriately several KΩ in general in a high impedance state. The value of impedance designated to the power reception apparatus 311 by the power transmission apparatus 210 may be set to any arbitrary value as long as the set value allows the detection unit 204 in the power transmission apparatus 210 to detect the fact that the power reception apparatus 311 has changed its impedance, instead of the detection of a high impedance. It is assumed here that the instruction of the impedance change from the first power transmission apparatus 101 to the first power reception apparatus 102 may instruct to change to a high impedance in 10 ms (405-1). It is further assumed that the instruction of the impedance change from the first power transmission apparatus 101 to the second power reception apparatus 106 instructs to change to a high impedance in 15 ms.

Each of the first power reception apparatus 102 and the second power reception apparatus 106 at a time T3 changes the impedance of the power reception antenna 303 through the change unit 304 in accordance with the instruction of the impedance change received from the first power transmission apparatus 101. In other words, the change unit 304 changes the power reception amount. According to this embodiment, the first power reception apparatus 102 and the second power reception apparatus 106 change the impedances in response to reception of the load impedance change instruction. However, the instruction may include a starting time for change the impedance.

The first power transmission apparatus 101 and second power transmission apparatus 105 at the time T3 detect that the voltage detected by the detection unit 204 has been changed from bV to cV. The first power transmission apparatus 101 and second power transmission apparatus 105 store detected values and corresponding periods of time in association by using a timer 207. Referring to FIGS. 4A and 4B, the first power transmission apparatus 101 detects cV through the detection unit 204 in 10 ms from the time T3.

Here, cV is a value detected in a case where one power reception apparatus 311 having the load impedance instructed by the power transmission apparatus 210 exists within the power transmittable range. It is assumed that the value is recognized by the power transmission apparatus 210 in advance. Because the power reception apparatus 311 having the high impedance does not substantially consume power transmitted by the power transmission apparatus 210, cV in FIGS. 4A and 4B are substantially equal to the detection value aV in the steady state.

While the first power transmission apparatus 101 transmits an instruction to change the impedance to the connected first power reception apparatus 102 and second power reception apparatus 106, a change is detected from only one of the apparatuses in a period instructed to the first power reception apparatus 102. Therefore, the first power transmission apparatus 101 determines that the first power reception apparatus 102 from which the instructed impedance change has been detected of the connected first power reception apparatus 102 and second power reception apparatus 106 is only present within the power transmittable range of the first power transmission apparatus 101. The first power transmission apparatus 101 also determines that the second power reception apparatus 106 from which the instructed impedance change has not been detected of the connected first power reception apparatus 102 and second power reception apparatus 106 is not present within the power transmittable range of the first power transmission apparatus 101. The first power transmission apparatus 101 exchanges control information and capability information for executing a wireless power transfer with the first power reception apparatus 102 determined as being present within the power transmittable range of the first power transmission apparatus 101. The first power transmission apparatus 101 disconnects the communication with the second power reception apparatus 106 determined as not being present within the power transmittable range of the first power transmission apparatus 101.

On the other hand, the second power transmission apparatus 105 detects cV in 15 ms from the time T3 through the detection unit 204. Though the second power transmission apparatus 105 does not transmit the impedance change instruction of the power reception apparatuses at the time T3, the detection result from the detection unit 204 may have a change. In this case, it may be recognized that there is a high possibility that at least one of the connected first power reception apparatus 102 and second power reception apparatus 106 has been improperly connected with a different power transmission apparatus instead of the second power transmission apparatus 105.

The second power transmission apparatus 105 transmits an instruction to change the impedance of the power reception antenna 303 to both of the first power reception apparatus 102 and second power reception apparatus 106 through the communication unit 206 (411-1, 411-2). The instruction to change the impedance transmitted from the second power transmission apparatus 105 to the first power reception apparatus 102 instructs to change the impedance to a high impedance in 15 ms (411-1). The instruction to change the impedance transmitted from the second power transmission apparatus 105 to the second power reception apparatus 106 instructs to change the impedance to a high impedance in 10 ms.

At a time T4, the first power reception apparatus 102 and second power reception apparatus 106 change the impedance of the power reception antenna 303 through the change unit 304 in accordance with the instruction to change the impedance received from the second power transmission apparatus 105.

The first power transmission apparatus 101 and second power transmission apparatus 105 at the time T4 detect that the voltage detected by the detection unit 204 has changed from bV to cV. The first power transmission apparatus 101 and second power transmission apparatus 105 store the detected value and its corresponding period in association by using the timer 207. The second power transmission apparatus 105 detects cV through the detection unit 204 in 10 ms from the time T4.

While the second power transmission apparatus 105 transmits an instruction to change the impedance to the connected first power reception apparatus 102 and second power reception apparatus 106, a change is detected from only one of the apparatuses in a change period instructed to the second power reception apparatus 106. Therefore, the second power transmission apparatus 105 determines that the second power reception apparatus 106 from which the instructed impedance change has been detected of the connected first power reception apparatus 102 and second power reception apparatus 106 is only present within the power transmittable range of the second power transmission apparatus 105. The second power transmission apparatus 105 also determines that the first power reception apparatus 102 from which the instructed impedance change has not been detected of the connected first power reception apparatus 102 and second power reception apparatus 106 is not present within the power transmittable range of the second power transmission apparatus 105. The second power transmission apparatus 105 exchanges control information and capability information for executing a wireless power transfer with the second power reception apparatus 106 determined as being present within the power transmittable range of the second power transmission apparatus 105. The second power transmission apparatus 105 disconnects the communication with the first power reception apparatus 102 determined as not being present within the power transmittable range of the second power transmission apparatus 105.

On the other hand, the first power transmission apparatus 101 detects cV in 15 ms from the time T4 through the detection unit 204. Though the first power transmission apparatus 101 does not transmit the impedance change instruction to any of the power reception apparatus at the time T4, the detection result from the detection unit 204 may have a change. This allows the first power transmission apparatus 101 to recognize that there is a high possibility that the first power reception apparatus 102 determined as being present within the communicable range of the first power transmission apparatus 101 has been improperly connected also to another power transmission apparatus. In this case, the first power transmission apparatus 101 requests the first power reception apparatus 102 to disconnect the communication with the other power transmission apparatus through the communication unit 206.

By performing these operations, the first power transmission apparatus 101 and first power reception apparatus 102 are connected, and the second power transmission apparatus 105 and second power reception apparatus 106 are connected.

After that, when communication in the communication establishment phase ends between the first power transmission apparatus 101 and the first power reception apparatus 102, the first power transmission apparatus 101 shifts to the power transmission phase where power transmission to the first power reception apparatus 102 is executed (406). When the communication in the communication establishment phase ends between the second power transmission apparatus 105 and the second power reception apparatus 106, the second power transmission apparatus 105 shifts to the power transmission phase where power transmission to the second power reception apparatus 106 is executed (412).

Next, operations to be performed by the power reception apparatus 311 illustrated in FIG. 3 according to this embodiment will be described with reference to the flowchart illustrated in FIG. 5. The processing on the flowchart illustrated in FIG. 5 is implemented by executing a control program stored in the memory 310 to execute calculations and processes on information and control over hardware by the control unit 301. A part or all of steps illustrated in the flowchart in FIG. 5 may be implemented by hardware such as an ASIC (Application Specific Integrated Circuit).

The detection unit 309 in the power reception apparatus 311 determines whether a detection power transmission has been detected or not through the power reception antenna 303 when the detection unit 309 starts running (S501). If a detection power transmission or a response request power transmission has been detected, the power reception apparatus 311 causes the control unit 301 and communication unit 302 to operate by using the received power and transmits through the communication unit 302 a notification signal for notifying information on the power reception apparatus 311 such as information regarding functions and services of the power reception apparatus 311 (S502). The notification signal is transmitted by broadcasting to cause neighboring apparatuses to transmit a connection request in a packet transmittable before a wireless connection is established. The transmission of the notification signal terminates after a lapse of a predetermined period of time from the time when the detection power transmission is not detected.

Referring to FIGS. 4A and 4B, the first power reception apparatus 102 at the time T2 detects a detection power transmission and a response request power transmission executed by the first power transmission apparatus 101, and the second power reception apparatus 106 at the time T2 detects a detection power transmission and a response request power transmission executed by the second power transmission apparatus 105 (S501, hereinafter S stands for step). The first power reception apparatus 102 and second power reception apparatus 106 transmit the notification signals 403-1 and 403-2, respectively (S502).

Referring back to FIG. 5, the control unit 301 after transmitting the notification signal determines whether the communication unit 302 has received a connection request from the power transmission apparatus 210 (S503). Until the reception of the connection request, S501, S502, and S503 are repeated. If the reception of the connection request is determined in S503, the communication unit 302 transmits a connection response to the power transmission apparatus 210 and establishes a wireless communication connection with the power transmission apparatus 210 (S504). After the connection is established, the control unit 301 determines whether the communication with the power transmission apparatus 210 connected by the communication unit 302 is disconnected or not (S505). If the communication is disconnected, the processing returns to S501.

If it is determined in S505 that the communication is maintained, the control unit 301 determines whether the impedance change instruction to change the impedance of a load is received from the power transmission apparatus 210 through the communication unit 302. If the impedance change instruction is received, the change unit 304 changes the impedance of the power reception antenna 303 in accordance with the received impedance change instruction (S506). In other words, the change unit 304 changes the impedance of the power reception antenna 303 to the value designated by the impedance change instruction, sets the period designated by the impedance change instruction in the timer 307, and changes the impedance of the power reception antenna 303 during the period (S507).

Referring to FIGS. 4A and 4B, the first power reception apparatus 102 and second power reception apparatus 106 receive the impedance change instructions (405-1, 405-2, respectively) transmitted from the first power transmission apparatus 101 (YES in S506). Then, the first power reception apparatus 102 and second power reception apparatus 105 at the time T3 change the impedances of the corresponding power reception antennas 303 in accordance with the instructions (S507).

The first power reception apparatus 102 and second power reception apparatus 106 receive the impedance change instructions (411-1, 411-2, respectively) transmitted from the second power transmission apparatus 105 (YES in S506). The first power reception apparatus 102 and second power reception apparatus 106 at the time T3 change the impedances of the corresponding power reception antennas 303 in accordance with the instruction (S507).

Referring back to FIG. 5, after the impedances are changed, the control unit 301 determines whether a communication has been started for exchanging information necessary for power transfer to the connected power transmission apparatus 210 (S508). If no communication is started for a predetermined period (such as five seconds) after the impedance change or the communication is disconnected from the connected power transmission apparatus 210, the control unit 301 returns the processing to S501. In S508, if the communication has been started, the communication unit 302 exchanges information necessary for power transfer with the connected power transmission apparatus 210, and the power reception unit 305 starts power reception from the power transmission apparatus 210 (S509).

Referring back to FIGS. 4A and 4B, the first power reception apparatus 102 exchanges information necessary for power transfer with the first power transmission apparatus 101 and starts power reception of the power 406 transmitted from the first power transmission apparatus 101 (S509). The second power reception apparatus 106 exchanges information necessary for power transfer with the second power transmission apparatus 105 and starts power reception of power 412 transmitted from the second power transmission apparatus 105 (S509).

After that, referring back to FIG. 5, the control unit 301 determines whether to stop the power reception (S510). Here, if a full charge is detected, if a user instructs to stop the operation, or if power transmission from the power transmission apparatus 210 is not detected, the stop of the power reception is determined. If the stop of the power reception is determined, the communication unit 302 may transmit control information requesting to stop the power transmission to the power transmission apparatus 210. If the stop of the power reception is determined, the processing ends.

Next, the operations to be performed by the power transmission apparatus 210 illustrated in FIG. 2 according to this embodiment will be described with reference to the flowchart illustrated in FIG. 6. The processing on the flowchart illustrated in FIG. 6 is implemented by executing a control program stored in the memory 208 to execute calculations and processes on information and control over hardware by the control unit 201. A part or all of steps illustrated in the flowchart in FIG. 6 may be implemented by hardware such as an ASIC.

The control unit 201 in the power transmission apparatus 210 stores in the memory 208 a detection result from the detection unit 204 upon detection power transmission in the steady state (S601). Next, the power transmission unit 203 starts intermittent detection power transmissions (S602). The control unit 201 determines whether the detection result from the detection unit 204 over the detection power transmissions has changed from the steady state (S603). The steady state is a state that no other apparatuses are close to or in contact with the power transmission apparatus 210.

Referring to FIGS. 4A and 413, the first power transmission apparatus 101 and second power transmission apparatus 105 start detection power transmissions at a time TO (S602).

Referring back to FIG. 6, the control unit 201 detects that an object exists within a power transmittable range of the power transmission apparatus 210 from a detection result from the detection unit 204. In other words, when the power reception apparatus 311 exists within the power transmittable range of the power transmission apparatus 210, the power consumed according to the load of the power reception apparatus 311 is received, which reduces the voltage detected by the detection unit 204 by a constant value. The expression "the power consumed according to the load of the power reception apparatus 311" refers to power necessary for operating the control unit 301 and communication unit 302 or power simply consumed by the power reception antenna 303. In a case where the voltage detected by the detection unit 204 does not have a change, the processing returns to S601 again where a detection power transmission is performed.

Referring to FIGS. 4A and 4B, the first power transmission apparatus 101 and second power transmission apparatus 105 detect a change in voltage detected by the detection unit 204 at the time T2. Referring back to FIG. 6, in a case where the voltage detected by the detection unit 204 has a change, the power transmission unit 203 starts a response request power transmission for supplying power to transmit a response to the power reception apparatus 311 (S604). The response request power transmission is a power transmission which continuously transmits a predetermined amount of power, unlike a detection power transmission to be performed intermittently. The control unit 201 determines whether a notification signal has been received from the power reception apparatus 311 within a predetermined period of time (such as 100 ms) after the start of a response request power transmission (S605). The notification signal from the power reception apparatus 311 may be identified by determining whether the received notification signal contains service information executable by a wireless power transmission system supported by the present system. If the notification signal has not been received, the processing returns to S601 again where a detection power transmission is performed.

If it is determined in S605 that the notification signal has been received from the power reception apparatus 311 within a predetermined period of time, the power transmission apparatus 210 transmits a connection request to the source of the notification signal received in S605 through the communication unit 302 and establishes a wireless communication connection (S606). If the notification signals have been received from a plurality of power reception apparatuses here, the connection request is transmitted to the corresponding sources to establish wireless communication connections.

Referring to FIGS. 4A and 4B, the first power transmission apparatus 101 receives the notification signals (403-1, 403-2) from the first power reception apparatus 102 and second power reception apparatus 106 within a predetermined period of time after the start of the response request power transmission (402-2) (YES in S605). The first power transmission apparatus 101 then transmits connection requests (404-1, 404-2) to the first power reception apparatus 102 and second power reception apparatus 106 to wirelessly connect to the first power reception apparatus 102 and second power reception apparatus 106 (S606). The second power transmission apparatus 105 receives the notification signals (408-1, 408-2) from the first power reception apparatus 102 and second power reception apparatus 106 within a predetermined period of time after the start of the response request power transmission (409-2) (YES in S605). The second power transmission apparatus 105 transmits the connection requests (410-1, 410-2) to the first power reception apparatus 102 and second power reception apparatus 106 to wirelessly connect to the first power reception apparatus 102 and second power reception apparatus 106.

Referring back to FIG. 6, when the wireless communication connection is established, the power transmission apparatus 210 transmits an impedance change instruction to the power reception apparatus 311 through the communication unit 302 by using the established communication connection (S607). In S606, if the power transmission apparatus 210 is wirelessly connected with a plurality of power reception apparatuses, different impedance changes may be designated to the power reception apparatuses. For example, different lengths of period for the impedance change may be designated to the power reception apparatuses. Alternatively, for example, different starting times for the impedance change may be designated to the power reception apparatuses, or different impedance values to be changed may be designated to the power reception apparatuses.

The periods from reception of the notification signal to the transmission of the impedance change instruction may be differentiated between the power transmission apparatuses by randomly setting the periods based on random numbers (random values) generated for the apparatuses. This may alleviate the malfunction in which impedance change instructions overlap among a plurality of power transmission apparatuses and which thus prevents proper identification of a power reception apparatus present within a power transmittable range. A plurality of impedance changes may be instructed to one power reception apparatus.

The impedance change instruction in S607 may be executed only when the notification signals are received from a plurality of power reception apparatuses. In other words, in a case where the notification signal is received from one power reception apparatus, the source of the notification signal received in S605 is determined as a power reception apparatus to which power is transmitted. A case where the notification signal is not received from a plurality of power reception apparatuses is caused when an object close to or in contact with the power transmission apparatus 210 exists and only one apparatus is determined as having responded to the detection power transmission. In this case, there is a high possibility that the object present in the power transmittable range is the one power reception apparatus. Therefore, in this case, because the power reception apparatus to which power is to be transmitted may be determined without executing the impedance change instruction, the power transmission may be started immediately. In order to reduce the possibility of improper connection or to detect a foreign body excluding a power reception apparatus, the processing in S607 may be configured also when the notification signal is received from one power reception apparatus.

After the impedance change instruction is performed, the control unit 201 determines whether the detection result from the detection unit 204 has a change or not (S608). If the detection result from the detection unit 204 does not have a change for a predetermined period (such as 5 seconds) after the impedance is changed in accordance with the impedance change instruction, the communication unit 206 disconnects the communication with the connected power reception. apparatus (S609). In this case, because the execution of the impedance change according to the impedance change instructed by the power reception apparatus 311 is not recognized, the connected power reception apparatus 311 determines that it is not present within the power transmittable range of the connected power transmission apparatus 210. Therefore, the power transmission apparatus 210 disconnects the communication with the power reception apparatus 311 determined as not being present within the power transmittable range. After the disconnection of the communication, the processing returns to S601 again where a detection power transmission is performed. If an object close to or in contact with the power transmission apparatus 210 is determined as a foreign body which is not a power reception apparatus, it may be configured to give an error notification or an indication for prompting a user to remove the foreign body and stop the power transmission.

On the other hand, if the detection result from the detection unit 204 has a change after the impedance change is instructed, the control unit 201 stores in the memory 208 a detection result from the detection unit 204 after the change and a length of a period measured by the timer 207 when the change occurs in association (S610). In S611, the control unit 201 determines whether the detection result from the detection unit 204 and the corresponding change period stored in the memory 208 are matched with the details instructed to one of the power reception apparatuses in S607 (S611). If it is determined that they are not matched with the details instructed to one of the power reception apparatus in S607, the power reception apparatus 311 having not detected the instructed impedance change determines that it is not present within the power transmittable range of the power transmission apparatus 210 and disconnects the communication with the power reception apparatus 311 (S612). Next, the control unit 201 determines whether any other connected power reception apparatus 311 exists or not (S619). If there still is a connected power reception apparatus 311, the processing returns to S608 for detecting an impedance change of the power reception apparatus 311. There is not connected power reception apparatus 311, the processing returns to S602.

On the other hand, if it is determined in S612 that the change is matched with details instructed to one of the power reception apparatuses in S607, the control unit 201 determines that the power reception apparatus having transmitted the instruction corresponding to the detection result from the detection unit 204 exists within the power transmittable range. The control unit 201 then identifies the power reception apparatus determined as being present within the power transmittable range as a power transmission target (S613). This processing allows the power transmission apparatuses to identify a power reception apparatus present within the power transmittable ranges of the power transmission apparatuses even in an environment that a plurality of power transmission apparatuses have communication ranges overlapping each other.

Referring to FIGS. 4A and 4B, because the first power transmission apparatus 101 detects an impedance change matched with the impedance change instruction (405-1) transmitted to the first power reception apparatus 102 for 10 ms from the time T3, the first power reception apparatus 101 is identified as a power transmission target (S613). The first power transmission apparatus 101 then disconnects the wireless communication with the second power reception apparatus 106 because an impedance change based on the impedance change instruction (405-2) transmitted to the second power reception apparatus 106 is not detected (S612). The first power transmission apparatus 101 disconnects the communication with the second power reception apparatus 106 before establishing a communication for a wireless power transfer with the second power reception apparatus 106 not present within the power transmission range of first power transmission apparatus 101. Therefore, the first power transmission apparatus 101 is allowed to limit the wireless power transfer to the second power reception apparatus 106 not present within the power transmittable range by reducing the number of times of unnecessary processing for wireless power transfer.

The second power transmission apparatus 105 identifies the second power reception apparatus 106 as a power transmission target because the impedance change matched with the impedance change instruction (410-2) transmitted to the second power reception apparatus 106 is detected for 10 ms from the time T4 (S613). The second power transmission apparatus 105 disconnects the wireless communication with the first power reception apparatus 102 because the impedance change matched with the impedance change instruction (410-1) transmitted to the first power reception apparatus 102 is not detected (S612). Thus, the second power transmission apparatus 105 disconnects the communication with the first power reception apparatus 102 before establishing a communication for wireless power transfer to the first power reception apparatus 102 not being present within the power transmission range of the second power transmission apparatus 105. Therefore, the second power transmission apparatus 105 is allowed to limit the wireless power transfer to the first power reception apparatus 102 riot present within the power transmittable range by reducing the number of times of unnecessary processing for wireless power transfer.

Referring back to FIG. 6, the communication unit 206 communicates (exchanges) with the power reception apparatus which is a power transmission target identified in S613 their capability information and information necessary for power transfer (S614) The power transmission unit 203 starts the wireless power transfer in the power transmission phase (S615).

Referring to FIGS. 4A and 4B, the first power transmission apparatus 101 exchanges with the first power reception apparatus 102 information necessary power transfer and starts the power transmission 406 to the first power reception apparatus 102 (S615). The second power transmission apparatus 105 exchanges with the second power reception apparatus 106 information necessary for power transfer and starts the power transmission 412 to the second power reception apparatus 106 (S615).

Referring back to FIG. 6, the control unit 201 determines to stop the power transmission if the control unit 201 receives a request to stop the power transmission from the power reception apparatus through the communication unit 206 or if an error occurring in the power transmission is detected (S616). if the stop of the power transmission is determined, the power transmission unit 203 stops the power transmission (S617), and the processing in S602 is performed again. The power transmission apparatus 210 ends the processing if the power supply is stopped (S618). Having described that the determination in S618 is performed after S617, the determination may be performed in any timing during the period for the processing.

As described above, the power transmission apparatus of this embodiment transmits the notification signal during a period corresponding to a detection power transmission and instructs to change a load that consumes the response request power to a connected power reception apparatus before transition to the power transmission phase. The power transmission apparatus then determines that the connected power reception apparatus is present within its power transmittable range if the instructed load change is detected.

Thus, in an environment that a plurality of power transmission apparatuses have communication ranges overlapping each other, the detection power transmissions to the plurality of power transmission apparatuses are executed simultaneously. Therefore, wireless power transfer may be implemented between proper apparatuses even when a plurality of power reception apparatuses respond to the detection power transmissions. This may alleviate the malfunction that improper connection with a power reception apparatus outside a power transmission range of a power transmission apparatus implements wireless power transfer between the wrong apparatuses.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD))™, a flash memory device, memory card, and the like.

The aforementioned embodiments may reduce the number of times of processing for unnecessary wireless power transfer performed by a power transmission apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-131618, filed Jun. 26, 2014, which is hereby incorporated by reference herein in its entirety.

The invention claimed is:

1. A power transmission apparatus comprising:
a power transmission antenna configured to perform wireless power transmission to a power reception apparatus;
a communication antenna configured to communicate with the power reception apparatus; and
one or more processors configured to cause the power transmission apparatus to:
receive a signal from the power reception apparatus using the communication antenna;
instruct the power reception apparatus to change an impedance of the power reception apparatus using the communication antenna;
determine whether the power reception apparatus changes the impedance of the power reception apparatus according to an instruction in the instructing the power reception apparatus to change the impedance of the power reception apparatus; and
control the power transmission antenna so that the wireless power transmission to the power reception apparatus is suppressed, based on determining that the power reception apparatus does not change the impedance of the power reception apparatus according to the instruction,
wherein, in a case where the power transmission apparatus receives signals from the power reception apparatus and another power reception apparatus, the one or more processors cause the power transmission apparatus to:
instruct respectively the power reception apparatus and said another power reception apparatus to change their respective impedances, wherein an instruction to the power reception apparatus comprises designation to change its respective impedance to a first value, and an instruction to said another power reception apparatus comprises designation to change its respective impedance to a second value, the second value being different from the first value, and
control the power transmission antenna so that the wireless power transmission to the power reception apparatus and said another power reception apparatus is respectively suppressed based on determining that each of the power reception apparatus and said another power reception apparatus does not change its respective impedance according to the respective instructions.

2. The power transmission apparatus according to claim 1, wherein the instruction to the power reception apparatus comprises designation of a period for changing the impedance of the power reception apparatus.

3. The power transmission apparatus according to claim 1, wherein the instruction to the power reception apparatus comprises designation of a length of a period for changing the impedance of the power reception apparatus.

4. The power transmission apparatus according to claim 1, wherein the instruction to the power reception apparatus comprises designation of a starting time for changing the impedance of the power reception apparatus.

5. The power transmission apparatus according to claim 1, wherein the power reception apparatus has an antenna for receiving power transmitted thereto; and
wherein the instruction to the power reception apparatus comprises designation of a change of the value of the impedance of the antenna of the power reception apparatus.

6. The power transmission apparatus according to claim 1, wherein the instruction to the power reception apparatus comprises designation of a first length of a period for changing the impedance of the power reception apparatus, and
wherein the instruction to said another power reception apparatus comprises designation of a second length of a period for changing the impedance of said another power reception apparatus, the second length being different from the first length.

7. The power transmission apparatus according to claim 1, wherein the instruction to the power reception apparatus comprises designation of a first starting time for changing the impedance of the power reception apparatus, and
wherein the instruction to said another power reception apparatus comprises designation of a second starting time for changing the impedance of said another power reception apparatus, the second starting time being different from the first starting time.

8. The power transmission apparatus according to claim 1, wherein a period of time from reception of the signal to an instruction given by the one or more processors is set.

9. The power transmission apparatus according to claim 1, wherein the one or more processors cause the power transmission apparatus to instruct the power reception apparatus to change an impedance a plurality of times.

10. The power transmission apparatus according to claim 1,
wherein the one or more processors further cause the power transmission apparatus to detect at least one of the voltage and the current input of the power transmission antenna after transmitting the instruction to the power reception apparatus.

11. The power transmission apparatus according to claim 1,
wherein, in a case where the one or more processors cause the power transmission apparatus to determine that the power reception apparatus does not change the impedance of the power reception apparatus according to the instruction to power reception apparatus, the one or more processors cause the power transmission apparatus not to acquire, from the power reception apparatus, information related to an amount of power to be wirelessly transferred.

12. The power transmission apparatus according to claim 1,
wherein the one or more processors cause the power transmission apparatus to determine whether the power reception apparatus changes the impedance of the power reception apparatus according to the instruction to the power reception apparatus, based on a detection result of at least one of a voltage and a current of the power transmission antenna.

13. The power transmission apparatus according to claim 1,
wherein the one or more processors further cause the power transmission apparatus to:
acquire, from the power reception apparatus, information related to an amount of power to be wirelessly transmitted, based on determining that the power reception apparatus changes the impedance of the power reception apparatus according to the instruction to the power reception apparatus, and
control the power transmission antenna so that the power transmission antenna performs wireless power transmission, based on the information acquired from the power reception apparatus.

14. The power transmission apparatus according to claim 1,
wherein the one or more processors cause the power transmission apparatus to instruct the power reception apparatus to change the impedance of the power reception apparatus so that an impedance of the power reception apparatus is larger than an impedance of the power reception apparatus before instructing the power reception apparatus to change the impedance of the power reception apparatus.

15. The power transmission apparatus according to claim 1,
wherein the one or more processors cause the power transmission apparatus to control the power transmission antenna so that, based on determining that a power reception apparatus from among the power reception apparatus and said another power reception apparatus does not change its respective impedance according to its respective instruction and that a power reception apparatus from among the power reception apparatus and said another power reception apparatus changes its respective impedance according to its respective instruction, the wireless power transmission to the power reception apparatus determined to not change its respective impedance is suppressed and the wireless power transmission to the power reception apparatus determined to change its respective impedance is performed based on information obtained from the power reception apparatus determined to change its respective impedance.

16. A control method for a power transmission apparatus, the power transmission apparatus including a power transmission antenna configured to wirelessly transmit power to a power reception apparatus and a communication antenna configured to communicate with the power reception apparatus, the method comprising:
receiving a signal from the power reception apparatus using the communication antenna;
instructing the power reception apparatus to change an impedance of the power reception apparatus using the communication antenna;
determining whether the power reception apparatus changes the impedance of the power reception apparatus according to an instruction in the instructing, and
controlling the power transmission antenna so that the wireless power transmission to the power reception apparatus is suppressed, based on determining that the power reception apparatus does not change the impedance of the power reception apparatus according to the instruction,
wherein, in a case where the power transmission apparatus receives signals from the power reception apparatus and another power reception apparatus,
instructing respectively the power reception apparatus and said another power reception apparatus to change their respective impedances, wherein an instruction to the power reception apparatus comprises designation to change its respective impedance to a first value, and an instruction to said another power reception apparatus comprises designation to change its respective impedance to a second value, the second value being different from the first value, and
controlling the power transmission antenna so that the wireless power transmission to the power reception apparatus and said another power reception apparatus is respectively suppressed based on determining that each of the power reception apparatus and said another power reception apparatus does not change its respective impedance according to the respective instructions.

17. A non-transitory computer-readable storage medium storing a program that when executed causes a computer to execute a control method for a power transmission apparatus, the power transmission apparatus including a power transmission antenna configured to wirelessly transmit power to a power reception apparatus and a communication antenna configured to communicate with the power reception apparatus, the method comprising:
receiving a signal from the power reception apparatus using the communication antenna;
instructing the power reception apparatus to change an impedance of the power reception apparatus using the communication antenna;
determining whether the power reception apparatus changes the impedance of the power reception apparatus according to an instruction in the instructing, and
controlling the power transmission antenna so that the wireless power transmission to the power reception apparatus is suppressed, based on determining that the power reception apparatus does not change the impedance of the power reception apparatus according to the instruction,
wherein, in a case where the power transmission apparatus receives signals from the power reception apparatus and another power reception apparatus,
instructing respectively the power reception apparatus and said another power reception apparatus to change their respective impedances, wherein an instruction to the power reception apparatus comprises designation to change its respective impedance to a first value, and an instruction to said another power reception apparatus comprises designation to change its respective impedance to a second value, the second value being different from the first value, and
controlling the power transmission antenna so that the wireless power transmission to the power reception apparatus and said another power reception apparatus is respectively suppressed based on determining that each of the power reception apparatus and said another power reception apparatus does not change its respective impedance according to the respective instructions.

\* \* \* \* \*